United States Patent [19]
Le Perchec et al.

[11] Patent Number: 5,973,080
[45] Date of Patent: Oct. 26, 1999

[54] PROCESS FOR THE PREPARATION OF RESINS WITH A PRIMARY AMINE OR GUANIDINE FUNCTION, AND RESINS THUS OBTAINED

[75] Inventors: Pierre Le Perchec, Lyons; Marie Abiuso, L'Arbresle; Emmanuel Arretz, Pau, all of France

[73] Assignee: Elf Aquitaine Production, Courbevoie, France

[21] Appl. No.: 09/014,426

[22] Filed: Jan. 27, 1998

Related U.S. Application Data

[62] Division of application No. 08/764,017, Dec. 11, 1996, Pat. No. 5,726,253.

[30] Foreign Application Priority Data

Dec. 11, 1995 [FR] France .................................. 95 14583

[51] Int. Cl.⁶ ...................................................... C08F 8/30
[52] U.S. Cl. ..................... 525/332.2; 521/32; 525/359.1; 525/379; 525/380
[58] Field of Search .............................. 525/332.2; 521/32

[56] References Cited

U.S. PATENT DOCUMENTS

| | | | |
|---|---|---|---|
| 3,856,715 | 12/1974 | Corte et al. .......................... | 260/2.1 R |
| 3,994,719 | 11/1976 | Corte et al. .......................... | 525/332.2 |
| 5,110,875 | 5/1992 | Jaxa-Chamiec et al. ............ | 525/332.2 |
| 5,300,628 | 4/1994 | Honda ................................... | 525/332.2 |
| 5,563,220 | 10/1996 | Webber et al. ....................... | 525/332.2 |

FOREIGN PATENT DOCUMENTS

94/19379  9/1994  WIPO.

OTHER PUBLICATIONS

Batres et al., "Poly(amidine)s and Poly*guanidine)s–Synthesis and Some Properties", *2445 Polymer bulletin*, 1(10):715–722, Sep. 1979.

*Primary Examiner*—Bernard Lipman
*Attorney, Agent, or Firm*—Millen, White, Zelano & Branigan, P.C.

[57] ABSTRACT

The process includes the reaction of a chloroformamidinium chloride with a polystyrene-divinylbenzene resin functionalized with primary amine groups. The resins which can be obtained according to this process may in particular have a spacer arm of general formula (IV):

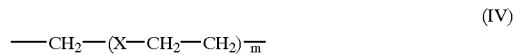

with X representing oxygen or sulphur and m being equal to 1 or 2. This spacer arm bears at its end, on the right, a primary amine group or a guanidine group.

5 Claims, No Drawings

PROCESS FOR THE PREPARATION OF RESINS WITH A PRIMARY AMINE OR GUANIDINE FUNCTION, AND RESINS THUS OBTAINED

This is a division, of application Ser. No. 08/764,017 filed Dec. 11, 1996, now U.S. Pat. No. 5,726,253.

BACKGROUND OF THE INVENTION

The present invention relates to a process for the preparation of resins based on polystyrene-divinylbenzene which are functionalized with primary amine or guanidine groups, and to novel resins which can be obtained by the use of this process.

These resins are used as bases, in particular as basic catalysts in liquid/solid heterogeneous phase reactions.

A process is known from U.S. Pat. No. 5,340,380, which consists in substituting the chlorine of a chloromethyl polystyrene-divinylbenzene resin with a substituted or unsubstituted guanidine and which makes it possible to obtain resins of general formula (A):

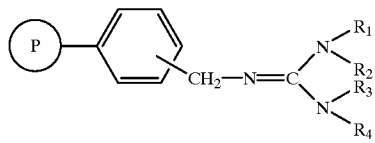

(A)

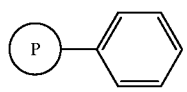

represents the starting solid polystyrene-divinylbenzene resin support it being possible for $R_1$, $R_2$, $R_3$ and $R_4$ each to be a hydrogen, an alkyl group or an aromatic group.

Thus, U.S. Pat. No. 3,346,516 describes this technique of functionalization by reaction of a chloromethyl polystyrene-divinylbenzene resin with gruanidine or tetramethylguanidine in the presence of a lower alcohol and a solvent for swelling the copolymer such as tetra-hydrofuran, dioxane or diglyme.

In U.S. Pat. No. 5,028,259, the tetramethyLguanidine is placed in contact with a chloromethyl polystyrene-divinylbenzene resin in a mixture of toluene and tetrahydrofuran.

In U.S. Pat. No. 5,340,380, guanidines are reacted with chloromethyl resins of this same type in the presence of sodium hydroxide in a solvent consisting of ethanol or water.

Moreover, S. V. Luis, M. I. Burguete and B. Altava, Reactive & Functional Polymers, 26, 1995, 75–83 indicate that the ready chloromethylation of polystyrene resins and the high reactivity of the resulting benzyl sites allows the introduction of a large number of functional groups and explains the widespread use of these polymers. On the other hand, these authors comment that the reduced length of the methylene spacer arm reduces the mobility on the functional groups introduced and, in certain cases, makes it difficult for reactants, substrates and solvents to gain access to them. This situation may lead to a decrease in the activity of the functional groups when they are compared with their soluble correspondents. In certain cases, a marked improvement in the activity of these groups bound to the resin has been obtained when the active site is separated from the polymer skeleton by a suitable spacer arm. S. V. Luis et al. prepare polystyrene resins having spacer arms in the form of a linear aliphatic chain containing 6 or 9 methylene groups and bearing a hydroxyl group —OH at the end of the chain. This hydroxyl group is converted into a tosylate leaving group, the latter being replaced by substitution with a tertiary amine group.

In this synthesis, S. V. Luis et al. use functionalization of the polystyrene resin by a Friedel Crafts type reaction using the acid chloride derived from a monoalkyl ester of an alkanedioic acid.

This synthesis has the major drawback, of reducing both a tosylhydrazone group and an ester group by the double hydride $LiAlH_4$ in tetrahydrofura THF. This reduction makes this synthetic route unattractive in terms of a large-scale industrial development of resins containing these $—(CH_2)_6—$ or $—(CH_2)_9—$ spacer arms.

Other authors have become interested in producing spacer arms in the form of a methylene chain. Thus, M. Tomoi, N. Kori and H. Kakiuchi, Reactive Polymers, 3, 1985, 341–349, introduce a long aliphatic chain onto polystyrene resins by alkylation with ω-bromoalkenes in the presence of trifluoromethanesulphonic acid.

However, this synthesis is limited to the preparation of polymers with a spacer arm which have a low degree of crosslinking (0–4%).

Starting with a chloromethyl polystyrene resin, G. D. Darling and M. J. Fréchet, J. Org. Chem., 51, 1986, 2270–2276 have, for their part, obtained a $—(CH_2)_2—$ spaer arm which separates the resin fram a hydroxyl —OH at the end of the chain. This hydroxyl is converted, into tosylate and then, via the Gabriel reaction using potassium phthalimide and lastly hydrazine, into primary amine. However, this synthesis has the drawback of using n-butyllithium or lithium aluminium hydride.

SUMMARY OF THE INVENTION

A principal object of the present invention is to propose a process for the preparation of resins based on polystyrene-divinylbenzene (PS-DVB), functionalized with guanidine groups, this process needing to be readily industrializable for the production of theese resins in large amounts. This process must be general and must make it possible in particular to produce resins with spacer arms which allow the guanidine functions to be spaced from the resin support by at least one methylene group.

Another object of the present invention is to provide PS-DVB resins equipped with spacer arms which are longer than a methylene group. The synthesis of these resins thus functionalized needs to be simple for industrial production and in particular needs to avoid the use of reactants of the butyllithium or lithium aluminium hydride type.

Upon further study of the specification and appended claims, further objects and advantages of this invention will become apparent to those skilled in the art.

The principal object of the invention is achieved by a process for the preparation of resins based on polystyrene-divinylbenzene (PS-DVB) which are functionalized with guanidine groups, characterized in that it comprises the following steps:

(1) providing a PS-DVB resin functionalized with a primary amine group this resin being of general formula (I):

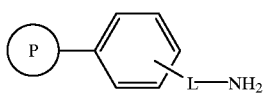

(I)

wherein:

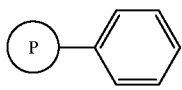

is the PS-DVB resin support, and L is a linear organic radical at least as long as methylene (—CH$_2$—), (2) reacting a chloroformamidinium chloride (Vilsmeier salt) with the resin (I) in the presence of a base, this chloride being of general formula (II):

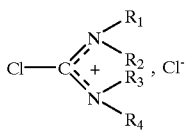

(II)

wherein R$_1$, R$_2$, and R$_3$ are, independently of each other, chosen from the methyl, ethyl, propyl, butyl, cyclohexyl and phenyl groups, to obtain a PS-DVB resin functionalized with a guanidine group and of general formula (III)

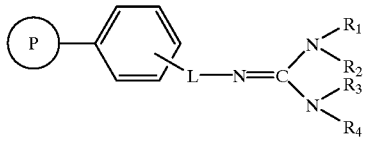

(III)

wherein:

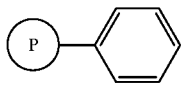

L and R$_1$ to R$_4$ have the same meanings as above.

The PS-DVB resins with a primary amine function of general formula (I) may be obtained by various techniques.

(1) it is possible, for example, to start with a resin of general formula (B):

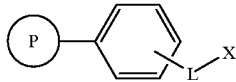

(B)

X being a leaving group, in particular halogen or tosylate obtained from hydroxyl group —OH, and L having the same meaning as above. Preferably, when L represents a single methylene, X is a chlorine atom. In this case, a method, described by D. H. Rich and S. K. Gurwara, J. Am. Chem. Soc., 97, 1575–1579, 1975, consists in reacting a chloromethyl PS-DVB resin with excess ammonia. Another route is based on the production of phthalimidomethyl PS-DVB resin, which is converted by hydrazinolysis into a resin with a primary amine function. Two methods for producing such phthalimidomethyl resins are described in the publication by A. R. Mitchell, S. B. H. Kent, B. W. Erickson and R. B. Merrifield, Tetrahedron Letters No. 42, 1976, 3795–3798. One consists in starting with a PS-DVB resin which, on reaction with N-(chloromethyl) phthalimide, is directly converted into phthalimidomethyl resin. The other method starts with a chloromethyl PS-DVB resin which is treated with potassium phthalimide to give the corresponding phthalimidomethyl resin. The latter method is also applicable to resins of formula (B) in the case where L is a linear organic radical longer than the methylene radical, in particular —(CH$_2$)$_n$— with n being equal to an integer greater than 1.

(2) It is also possible to start with a PS-DVB resin of formula (B) in which L represents a methylene and X has the above meaning and preferably represents a chlorine atom. For example, the chloromethyl resin is reacted with an alkanolamine, in alkaline alkoxide form, under the Williamson reaction conditions.

If ethanolamine is used, PS-DVB resins having a primary amine function with —CH$_2$—O—CH$_2$—CH$_2$—NH$_2$ functional groups bound to the PS-DVB resin supports are obtained.

If 2-(2-aminoethoxy)ethanol is used, PS-DVB resins having a primary amine function with —CH$_2$(O—CH$_2$—CH$_2$)$_2$—NH$_2$ functional groups bound to these supports are obtained.

Similarly, starting with 2-aminoethanethiol hydrochloride, —CH$_2$—S—CH$_2$—CH$_2$—NH$_2$ functional groups are obtained.

Lastly, using 2-[(2-aminoethylthio]ethanethiol, —CH$_2$—(S—CH$_2$—CH$_2$)$_2$—NH$_2$ functional groups are obtained.

This starting mercaptoalkylamine may be prepared according to Iwakura et al., J. Polym. Sci. Part A, 2, 1964, 881–883 or according to I. Voronkov, M. G. et al., Chem. Heterocycl. Compd. (Engl. Transl.)15, 1979, 1183–1185.

Thus, the following intermediate PS-DVB resins may be obtained:

A resin based on PS-DVB, characterized by its general formula (I):

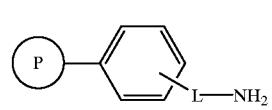

(I)

wherein:

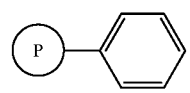

is the PS-DVB resin support, L represents the radical of general formula (IV):

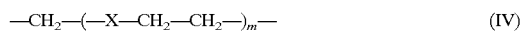

(IV)

X represents oxygen —O— or sulphur —S— and m equals 1 or 2.

Advantageously, X represents oxygen and m is equal to 1.

Advantageously, X represents sulphur and m is equal to 1.

These intermediate resins bearing a primary amine group at the end of the chain may be used as basic catalysts in chemical reactions in heterogeneous medium.

The general conditions of the Williamson reaction are as follows:

The alkanolamine or the mercaptoalkylamine diluted in anhydrous tetrahydrofuran (THF) is reacted with sodium hydride suspended in anhydrous THF. After formation of the sodium alkoxide or the sodium mercaptide, the chloromethyl resin is introduced into the liquid reaction medium.

The PS-DVB resins used as starting materials in the present invention are obtained in a known manner by copolymerization of styrene with DVB as crosslinking agent. The DVB is used at weight contents ranging from 0.5% to 60% relative to the total weight of PS plus DVB.

With a low content of DVB (0.5 to 7%), copolymers in the form of gels are obtained, whereas with higher DVB contents, macrocrosslinked resins of macroporous type may be obtained. Such resins are commercially available.

These PS-DVB resins may be chloromethylated with chloromethyl ether, according to known techniques which are described in the literature, to variable chlorine (—Cl) contents, generally from 1 to 20% by weight of chlorine relative to the weight of chloromethyl resin.

The resins with terminal guanidine functions of general formula (III) are obtained by reaction of chloroformamidinium chlorides of general formula (II) with the PS-DVB resins of general formula (I).

The chloroformamidinium chlorides (II) are generally obtained from tetrasubstituted ureas by reaction with electrophilic compounds such as phosgimne, thionyl chloride, oxalyl chloride or phosphorus oxychloride, according to methods described in the literature, in particular:

$COCl_2$ H. Eilingsfeld, M. Seefelder, Angew.Chem., 72, 1960, 836.

$SOCl_2$ H. Ulrich, A. A. R. Sayigh, Angew. Chem. Intern. Ed. Engl., 5, 1966, 704.

$(COCl)_2$ T. Fujisawa et al., Chem. Lett., 1982, 1891.

$POCl_3$ H. Bredereck, K. Bredereck, Chem. Ber., 94, 1961, 2278.

Generally, stoichiometric amounts of tetrasubstituted ureas and of electrophilic chloro compounds are used at the start and the process is performed in the presence of a solvent such as carbon tetrachloride in the case of oxalyl chloride, or without solvent with phosgene or thionyl chloride, at a temperature generally of from 0° C. to 40° C., and under an anhydrous atmosphere to prevent any hydrolysis.

The tetrasubstituted ureas are advantageously chosen from tetramethylurea, tetraethylurea, tetra-n-propylurea and tetra-n-butylurea.

The chloroformamidinium chlorides (II) are generally placed in a solvent such as toluene or acetonitrile. Their reactions with the resins containing a primary amine function (I) are carried out in the presence of a base, preferably in the presence of an excess of base.

If the base is triethylamine (TEA), the process is generally performed with a molar excess of TEA of from 10 to 50% relative to the chloroformamidinium chlorides (II). The latter are generally in a molar eccess of from 10 to 100% relative to the number of moles of primary amine function, in order to convert all of the latter into guanidine functions.

In the process according to the invention, L may represent a methylene —$CH_2$—.

Advantageously, L represents the radical of formula (IV)

$$-CH_2-(-X-CH_2-CH_2-)_m-\qquad(IV)$$

in which X represents oxygen —O— or sulphur —S— and m is equal to 1 or 2.

Preferably, in the formula (IV), X represents oxygen and m is equal to 1.

Preferably also, in the formula (IV), X represents sulphur and m is equal to 1.

The present invention also relates to any resin based on PS-DVB, which can be obtained according to the process outlined above, characterized by its general formula (V):

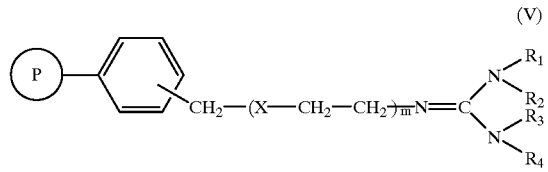

(V)

in which X represents the oxygen or sulphur atom and m is equal to 1 or 2, $R_1$, $R_2$, $R_3$ and $R_4$ are, independently of each other, chosen from the methyl, ethyl, propyl, butyl, cyclohexyl and phenyl groups.

Preferably, in the formula (V), $R_1$, $R_2$, $R_3$ and $R_4$ each represent a methyl group and m is equal to 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

Experimental Section

The resins are dried under a vacuum of about $4\times10^3$ pascal.

1. Production of a First Resin of Formula (I) in which L Represents —$CH_2$—.

(a) The PS-DVB resin used is a porous synthetic copolymer marketed by the company Rohm and Haas: Amberlite XAD-4. The characteristics of this highly crosslinked macroporous resin with a high specific surface are, according to the Rohm and Haas technical sheet:

Specific surface: 750 $m^2/g$

Average pore diameter: 50 Å

Pore volume: 51%

(b) Functionalization of this resin with N-(chloromethyl) phthalimide.

10 g of pre-dried Amberlite X AD-4 resin are added to a solution composed of 0.5 ml (0.0043 mol) of tin tetrachloride in 30 ml of 1,2-dichloroethane and a solution of 6.7 g (0.0342 mol) of N-(chloromethyl) phthalimide in 20 ml of 1,2-dichloroethane is then added with stirring at a temperature of 60° C. The reaction medium is kept stirring at reflux (82–84° C.) for 5 hours. After cooling to room temperature, the resin is filtered off and washed with 1,2-dichloromethane and then with methanol. After drying under vacuum at 60° C., 13.1 g of modified resin are obtained. IR spectrum: ν and δ band of CO—N—CO at 1770 cm$^{-1}$ and 1710 cm$^{-1}$.

(c) Formation of the primary amine by hydrazinolysis.

12 g of the modified resin obtained are placed in 40 ml of absolute ethanol. 4.5 ml (0.092 mol) of hydrazine hydrate and 0.9 g (0.022 mol) of sodium hydroxide pellets are added to this suspension. The mixture is maintained at reflux for 48 hours. After cooling to room temperature, the resin is filtered off and washed with ethanol and then treated with aqueous 5% by weight potassium hydroxide solution. The resin is then washed with water to neutral pH, with ethanol, with acetone and with methanol. After drying under vacuum at 60° C., 11 g of resin are obtained.

IR spectrum: no more characteristic bands at 1770 cm$^{-1}$ and 1710 cm$^{-1}$ for the phthalimide group —CO—N—CO—

Elemental analysis: 3.53% of nitrogen corresponding to 2.52 mmol of —NH$_2$ group/g of resin.

2. Production of a Second Resin of Formula (I) in which L Represents —CH$_2$—.

(a) The pre-chloromethylated PS-DVB resin has the following characteristics, determined by analysis:

Chlorine content: 19.32% by weight (Cl=5.44 meq/g of resin)

Specific surface: 22.5 m$^2$/g

Average pore diameter: 20 Å

Pore volume: 69%.

(b) Functionalization of this resin with potassium phthalimide.

10 g (0.054 eq.Cl) of this chloromethyl resin are placed in a solution of 10.1 g (0.054 mol) of potassium phthalimide in 150 ml of anhydrous dimethylformamide (DMF) at a temperature of 50° C. and the suspension thus obtained is left at this temperature for 24 hours. After cooling to room temperature, the resin is filtered off and washed with DMF, with methanol, with water, then again with methanol and finally with acetone. After drying under vacuum, 15.4 g of resin are obtained.

(c) Formation of the primary amine by hydrazinolysis.

The above phthalimidomethyl resin (15.4 g) is placed in a solution of 6.6 ml (0.136 mol) of hydrazine hydrate in 150 ml of absolute ethanol, after addition of 1 g of sodium hydroxide pellets, and the mixture is stirred mechanically and maintained at reflux for 48 hours. The hot resin is then filtered off and washed with ethanol, then with water and, lastly, is treated with 400 ml of aqueous 10% by weight potassium hydroxide solution. After this treatment, the resin is washed with water until neutral, then with ethanol and finally with acetone. After drying under vacuum at 60° C., 10 g of resin are obtained.

Elemental analysis: N=5.46% by weight, i.e. a capacity of 3.92 mmol of primary amine function (—NH$_2$)/g of resin.

3. Production of a Third Resin of Formula (I) in which L Represents the —CH$_2$—O—CH$_2$—CH$_2$— radical.

The chloromethyl PS-DVB resin used is the same as that above in 2.a).

(a) Production of the primary amine resin.

A solution of 6.1 g of 60% sodium hydride (0.1525 mol) dissolved in 150 ml of anhydrous THF (distilled over sodium) is prepared. A solution of 9.8 ml (0.1633 mol) of ethanolamine in 100 ml of anhydrous THF is added slowly to this solution under a nitrogen atnosphere. The reaction medium is kept stirring at 20° C. for 1 hour and is then maintained at reflux for 2 hours. After cooling to 20° C., 20 g of the chloromethyl resin are introduced slowly. The reaction medium is brought to 70° C. with continued stirring and is maintained at this temperature for 48 hours. After cooling, the resin is filtered off and is then washed successively with water, with aqueous 5% by weight potassium hydroxide solution, then with water until neutral and finally with methanol. The resin is dried under vacuum at 60° C. and 20.1 g of the primary amine resin bearing the —CH$_2$—O—CH$_2$—CH$_2$— spacer arm are obtained.

Elemental analysis: N=4.28% by weight, i.e. a capacity of 3.05 mmol of primary amine function (—NH$_2$)/g of resin.

4. Preparation of Vilsmeier Salts (a) Preparation of tetramethylchloroformamidinium chloride A solution of 3.2 ml (0.037 mol) of oxalyl chloride in 30 ml of anhydrous carbon tetrachloride is added dropwise to a solution of 4.4 ml (0.037 mol) of tetramethylurea in 20 ml of anhydrous carbon tetrachloride with stirring. The reaction medium is maintained at reflux, with continued stirring, until the evolution of gases (CO and CO$_2$) formed by the reaction has ceased. The CCl$_4$ is than eliminated by distillation at atmospheric pressure. Tetramethylchloroformamidinium chloride is obtained in the form of a white solid (6.23 g). This solid is placed in solution at 0° C. in 40 ml of anhydrous acetonitrile.

(b) Preparation of tetra-n-butylchloroformamidinium chloride.

5.5 g (0.055 mmol) of phosgene gas are bubbled over 2 hours into 10.4 g (0.037 mol) of tetra-n-butylurea with stirring, at a temperature of 80° C. When introduction of the phosgene is complete, the reaction medium is maintained at 80° C. for 5 hours with stirring. The excess phosgene is removed by evaporation under vacuum. The residue from this evaporation is tetra-n-butylchloroformamidinium chloride in the form of a white solid (12.45 g).

This solid is placed in solution at 0° C. in 40 ml of anhydrous acetonitrile.

5. Preparation of resins with a 1,1,3,3-tetramethylguanidine function of general formula (III) with $R_1=R_2=R_3=R_4=$ methyl. Starting with the primary amine resins of formula (I) prepared above in points 1c), 2c) and 3a) and L represents —CH$_2$—: resin A-109 manufactured by the company Purolite and having the following characteristics:

Capacity determined by assay: 4.3 meq of primary amine functioning of resin

Specific surface: 32.8 m$^2$/g

Average pore diameter: 45 Å

Pore volume: 68.5%, the resins of formula (III) are prepared using tetramethylchloroformamidinium chloride, the characteristics of which resins are disclosed in Table 1, according to the following procedure:

6.23 g (0.037 mol) of tetrarmethylchloroformamidinium chloride dissolved in 40 ml of acetonitrile are added to 10 g of resin with a primary amline function mixed with 8.7 ml (0.0625 mol) of triethylamine, under an anhydrous nitrogen atmosphere and at a temperature of 0° C. The reaction medium is kept stirring for 4 days at a temperature of 20° C. and is then maintained at reflux for 1 hour. After cooling to 20° C., the resin is filtered off and is washed with acetonitrile. It is then treated with a 10% by weight solution of sodium hydroxide. It is then washed successively with water until neutral, with acetone, with methanol and again with acetone. The resin is then dried under vacuum at 60° C. to constant weight.

The characteristics of the resins prepared above are disclosed in Table 1 below:

TABLE 1

| Example No. | Resin - $NH_2$ Preparation and L | $NH_2$ meq/g | Tetramethylguanidine (TMG) resins Elemental analysis | | | | | meq of TMG/g of resin |
|---|---|---|---|---|---|---|---|---|
| | | | C % | H % | N % | Cl % | O% | |
| 1 | 1) L = —$CH_2$— | 2.52 | 85.44 | 8.35 | 5.67 | 0.54 | — | 1.35 |
| 2 | 2c) L = —$CH_2$— | 3.92 | 81.25 | 7.60 | 6.35 | 0.79 | 4 | 1.51 |
| 3 | 3a) L = —$CH_2$—O— $(CH_2)_2$- | 3.05 | 77.73 | 8.40 | 6.98 | 2.42 | 4.46 | 1.66 |
| 4 | Purolite A109 L = —$CH_2$— | 4.3 | 81.68 | 3.26 | 8.40 | 0.71 | 0.94 | 2 |

EXAMPLE 5

Preparation of a Resin with a 1,1,3,3-tetra-n-butylguanidine Function of Formula (III) in which L Represents —$CH_2$—

The PS-DVB resin with a primary amine function obtained according to 1a), b) and c) above is used in the following procedure:

12.45 g (0.0367 mol) of tetra-n-butylchloroformamidinium chloride dissolved in 40 ml of anhydrous acetonitrile are added to 10 g of this aminomethyl resin (0.0252 mol of —$NH_2$ function) and 8.7 ml (0.0625 mol) of triethylamine, under an anhydrous nitrogen atmosphere and at a temperature of 0° C. The reaction medium is kept stirring at 20° C. for 4 days and is then maintained at reflux for 1 hour. After cooling to 20° C., the resin is filtered off and is washed with acetonitrile and then treated with aqueous 10% by weight sodium hydroxide solution. It is then washed successively with water until neutral, with acetone, with methanol and again with acetone. After drying under vacuum at 60° C., 11.3 g of resin are obtained.

This resin has the following characteristics: Elemental analysis: N=4.7% by weight, i.e. a capacity of 1.1 mmol of tetrabutylguanidine function/g of resin

EXAMPLE 6

Use of the Resins of General Formula (III) with a Guanidine Function, which are Obtained According to Examples 1, 2, 3 and 4 above, as Basic Catalysts The activity of the guanidine resins of Examples 1 to 4 was tested in the addition of a compound with a labile hydrogen to an activated olefin by reacting methyl 2-oxocyclopentanecarboxylate and methyl vinyl ketone to give methyl 3-oxobutyl-2-oxocyclopentanecarboxylate by a Michael reaction.

The tests are carried out in a three-necked round-bottomed flask fitted with a mechanical stirrer and one neck of which is fitted with a Teflon septum which allows samples of the liquid reaction medium to be withdrawn during the reaction. These withdrawn samples are analysed by gas chromatography. The operations for loading the flask are carried out under a nitrogen atmosphere.

The resin (0.5 g for each test) is introduced into the reactor with 140 ml of anhydrous THF with 2.56 g (0.02 mol) of nonane used as internal standard for the subsequent chromatography. The solution thus obtained is thermostatically adjusted to 24° C. and stirred at 800 revolutions/minute. After 30 min. the following reactants are introduced: 2.86 g (0.02 mol) of methyl 2-oxocyclopentanecarboxylate and 1.4 g (0.02 mol) of methyl vinyl ketone. The samples taken at determined times are analysed directly on a Chrompack DB1 capillary column 15 meters in length. The results are featured in Table 2.

TABLE 2

| | Yield as a % by mass of addition product | | | |
|---|---|---|---|---|
| Time in min. | Resin Example 1 | Resin Example 2 | Resin Example 3 | Resin Example 4 |
| 10 | 11 | 2 | 12 | 4 |
| 20 | 20 | 6.5 | 25.5 | 7 |
| 30 | 26 | 9.5 | 40 | 13 |
| 60 | 44 | 19.5 | 62 | 25 |
| 80 | 51 | 24 | 72 | 31 |
| 160 | 70 | 38 | 93 | 49 |
| 240 | 76 | 52 | 100 | 59 |
| 320 | 89 | 61.5 | — | 72 |

These results show that the guanidine resin of Example 3, which possesses a spacer arm L=—$CH_2$—O—$CH_2$—$CH_2$—, is markedly more active than the resins of Examples 1, 2 and 4 in which L represents a —$CH_2$—.

The preceding examples can be repeated with similar success by substituting the generically or specifically described reactants and/or operating conditions of this invention for those used in the preceding examples.

The entire disclosure of all applicaitons, patents and publications, cited above and below, and or corresponding French application 95/14583, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A resin of formula (V)

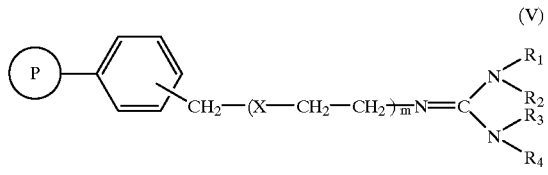

wherein X represents oxygen or sulphur and m is equal to 1 or 2, $R_1$, $R_2$, $R_3$ and $R_4$ are, independently of each other, selected from the group consisting of methyl, ethyl, propyl, butyl, cyclohexyl and phenyl groups, and

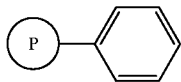

is a polystyrene-divinyl benzene resin support.

2. A resin according to claim 1, wherein $R_1$, $R_2$, $R_3$ and $R_4$ each represent a methyl group and m is equal to 1.

3. A resin of formula (I):

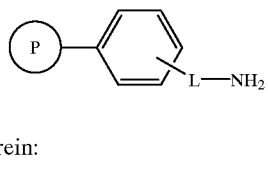

wherein:

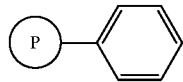

is a polystyrene-divinyl benzene resin support, and

L represents a radical of the formula (IV):

X representing oxygen —O— or sulphur —S— and m being equal to 1 or 2.

4. A resin according to claim 3, wherein X represents oxygen and m is equal to 1.

5. A resin according to claim 3, wherein X represents sulphur and m is equal to 1.

* * * * *